United States Patent [19]

Ikeda et al.

[11] Patent Number: 4,983,440
[45] Date of Patent: Jan. 8, 1991

[54] OPTICAL RECORDING MEDIUM AND RECORDING PROCESS UTILIZING THE SAME

[75] Inventors: Minoru Ikeda, Kurashiki; Koichi Saito, Okayama; Hideki Kobayashi, Kurashiki, all of Japan

[73] Assignee: Kuraray Company, Ltd., Kurashiki, Japan

[21] Appl. No.: 200,435

[22] Filed: May 31, 1988

[30] Foreign Application Priority Data

May 30, 1987 [JP] Japan ................ 62-135556
May 30, 1987 [JP] Japan ................ 62-135558

[51] Int. Cl.$^5$ ................ B32B 3/02
[52] U.S. Cl. ................ 428/64; 428/65; 428/209; 428/411.1; 428/412; 428/457; 428/458; 428/461; 428/463; 428/474.4; 428/480; 428/500; 428/697; 428/704; 428/913; 430/945; 346/766; 346/135.1; 369/288
[58] Field of Search ........ 428/64, 65, 209, 411.1, 428/412, 457, 458, 461, 463, 474.4, 480, 500, 697, 704, 913; 430/945; 346/766, 135.1; 369/288

[56] References Cited

U.S. PATENT DOCUMENTS 4,499,178 2/1985 Wada et al. ................ 430/271
4,795,660 1/1989 Cooray et al. ................ 427/123
4,840,873 6/1989 Kobayashi et al. ................ 430/273

FOREIGN PATENT DOCUMENTS 62-22249 1/1987 Japan .
62-30085 2/1987 Japan .

OTHER PUBLICATIONS

CA 111(16):144217j, Ikeda et al., JP01051990.

*Primary Examiner*—Patrick Ryan
*Attorney, Agent, or Firm*—Oblon, Spivak, McClelland, Maier & Neustadt

[57] ABSTRACT

An optical recording medium comprising a plastic substrate having a surface of minutely roughened structure and a thin metal film formed on the substrate is capable of strongly absorbing laser light of a specific wavelength region, thereby writing data on the medium. The optical recording medium is characterized in that the thin metal film comprises a metal of the platinum group and a second metal or semi-metal such that the thermal conductivity of the thin metal film is not higher than 80% of the thermal conductivity of the platinum group pure metal. The optical recording medium is, since jitter has been decreased, capable of a high-sensitivity and high-CNR recording.

29 Claims, 3 Drawing Sheets

OPTICAL RECORDING MEDIUM AND RECORDING PROCESS UTILIZING THE SAME

BACKGROUND OF THE INVENTION

1. Field of the Invention

The present invention relates to an optical recording medium for recording and reading information by means of a laser beam.

2. Description of the Background

Optical recording media for recording and reading information by means of a laser beam have rapidly become practical on account of the recent development of fundamental technology of semiconductor lasers, recording materials and film making processes, and also by virtue of their ability to record a large amount of information. For an optical recording medium to be able to record information, a phase change leading to an optical change should take place at the part struck with a laser beam. Bubble (vacant space) making, pitting (pit or cavity formation), and amorphous state-crystalline state transfer are some of the recording methods proposed so far.

For example, techniques for recording media utilizing bubble making are disclosed in Japanese Patent Application Kokai Nos. 65340/1982 and 127937/1981.

In the case of recording media utilizing pit or cavity formation (hereinafter simply referred to as "pitting"), principal ones comprise as main component a chalcogen such as Te, Se, S, etc., and the technique is disclosed, e.g., in Japanese Patent Application Kokai Nos. 71193/1983, 110634/1977, and 146691/1982.

However, since most of chalcogen elements are chemically unstable, there is doubt about the durability of the media utilizing such elements, and attempts have been made to improve it by incorporating various additives, providing a protective film, or the like.

Generally, in the case of recording media by pitting, there has been encountered a drawback of inevitable scattering or depositing of portions of recording film onto the circumferences of the cavities being formed, making it difficult to improve the carrier to noise ratio (CNR) of the signals being read.

On the other hand, recording media by bubble making as proposed in Japanese Patent Application No. 127937/1981, while avoiding the above-mentioned drawback, still has the drawback of having a low recording sensitivity. Further, a recording medium proposed in Japanese Patent Application Kokai No. 65340/1982 shows an improvement on efficiency in utilization of a laser beam by providing a beam-reflecting layer between the substrate plate and an organic intermediate layer. In practice, however, it requires strictly specifying the thicknesses of the energy (light) absorbing layer and the intermediate plastic layer in relation to the wavelength of laser beam to be used, thereby causing the manufacturing process to be complex and the production yield to decrease.

An optical recording medium which is made up of a plastic substrate having a surface of minutely roughened structure and a thin metal film formed on the substrate is disclosed in Japanese Patent Application Kokai No. 135643/1984 and U.S. Pat. No. 4,616,237. The optical recording medium is characterized by more efficient absorption of the laser beam for recording as compared to a recording medium made up of a plain-surface plastic substrate and a thin metal film formed thereon and is therefore capable of recording with a lower power, which results in simplified construction of the recording medium. However, with the recent reduction in burden on the laser beam for recording, and development of multifunctional drives, laser cards, etc., demands for a high-sensitivity optical recording medium having a high CNR and causing reduced jitter have increased.

SUMMARY OF THE INVENTION

An object of the present invention is to solve the above-mentioned problems of conventional optical recording media and to provide an optical recording medium having a higher sensitivity.

Another object is, for an optical recording medium which is made up of a plastic substrate having a surface of minutely roughened structure and a thin metal film formed on the substrate, to provide, by using as a light absorbing layer a film of a composite composed of at least two components of metal or semi-metal, an optical recording medium having a higher recording sensitivity compared to those of conventional arts and being of a simple construction.

This invention provides an optical recording medium which comprises a transparent plastic substrate having a surface of minutely roughened structure and a thin metal film laminated on the substrate, and which strongly absorbs laser light of a specific wavelength region to change the structure of the thin metal film, thereby recording data on the medium, characterized in that the thin metal film comprises a metal of the platinum group and another or second metal or semi-metal (metalloid) and that the film has a heat conductivity not higher than 80% of that of the platinum group metal as an essential component. In this specification, "to change the structure of the thin metal film" means to record by means of a change in the structure of the thin metal film such as pitting, bubble making or the like, caused by deformation, fusion or evaporation.

According to the present invention, it is possible to obtain a chemically stable optical recording medium capable of recording with a high CNR, with reduced jitter and of high sensitivity, by using an optical recording medium which is made up of a substrate and thin metal film formed on the substrate, in which the thin metal film layer comprises a composition of a platinum group pure metal as an essential component and at least one metal or semi-metal element incorporated thereinto and having a thermal conductivity not higher than that of the platinum group pure metal.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
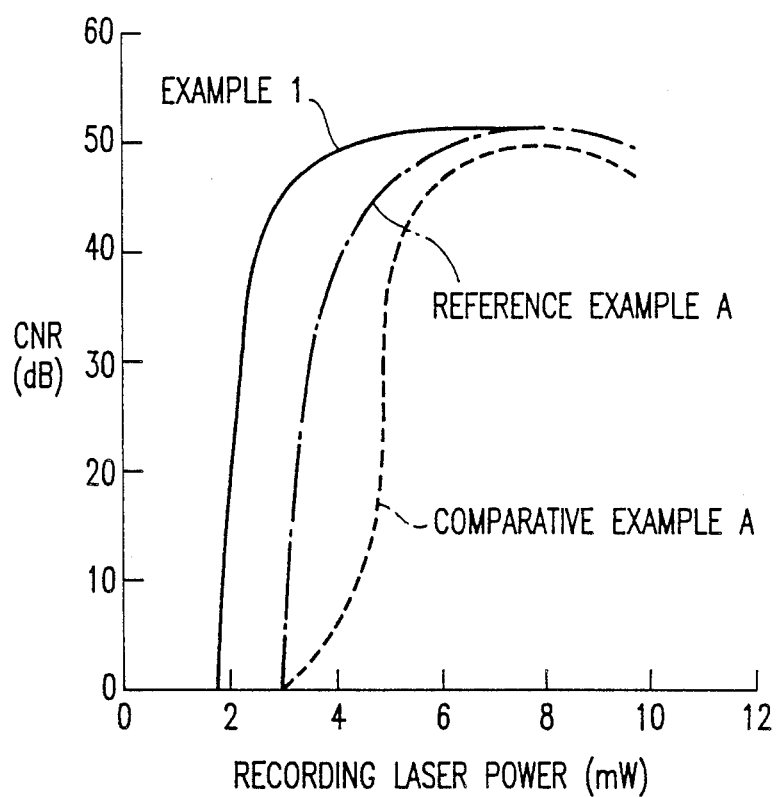
FIG. 1 is a diagram showing the relationships between the recording laser power and the CNR measured in Example 1, Comparative Example A and Reference Example A.

The basic construction of the recording medium of the present invention comprises a transparent plastic substrate having a surface of minutely roughened structure and a thin metal film formed on the substrate. This basic construction can be obtained according to, for example, U.S. Pat. No. 4,616,237 or Japanese Patent Application Kokai No. 135643/1984.

The transparent plastics to be used can be any transparent plastic which undergoes thermal decomposition or heat distortion at the part of thin metal film layer struck with recording laser light. Examples of such plastics include polyester resins, polyolefin resins, polyamide resins, polycarbonate resins, polymethacrylate resins, and the like which have good transparency.

The laser source is not specifically limited; but a semiconductor laser is preferable to make the drive unit compact. The wavelength of the laser is preferably from about 750 to 850 nm. The power for the recording laser is preferably from about 1 to 10 mW.

The minutely roughened structure on the surface of the plastic substrate can be easily produced by such formation processes as calendering, injection molding, injection-compression molding, compression molding, photopolymer process (2P process) or the like with a mold in which the inner surface has a minutely roughened surface structure.

The minutely roughened structure strongly absorbs the laser light of a prescribed wavelength region, thereby facilitating the writing with the laser beam. The roughened structure should preferably be such that the regular pitch measured in the direction parallel to the average surface level is smaller than the wavelength of the laser light for writing and reading, and the depth is about 0.01 to 1 $\mu$m, preferably 0.05 to 1 $\mu$m. If the pitch in the horizontal direction is greater than the wavelength of the laser light or if the depth is smaller than 0.01 $\mu$m, the substrate needs as much recording power as a smooth surface substrate. In other words, such a substrate does not produce the effect of roughened structure. On the other hand, if the depth is greater than 1 $\mu$m, the substrate efficiently absorbs the recording laser light but has the disadvantage that it cannot be produced by the aforementioned molding methods in a short time with good reproducibility.

The thin metal film used in this invention should be made of a composition (including an alloy) containing a platinum group element as an essential component and another metal or semi-metal and having a thermal conductivity not higher than 80% of that of the pure metal of the platinum group.

Examples of the platinum group elements are platinum, ruthenium, rhodium, palladium, osmium and iridium, among which particularly preferred is platinum. Thin metal films containing platinum as an essential component have the characteristics of having a high chemical stability and being capable of maintaining initial properties of the recording media over a long period.

Also thin metal films containing platinum as an essential component are characterized by their high ductility and are therefore suitable for recording by bubble making.

The thin metal film layer (light absorbing layer) of the present invention should be a film made of a composition comprising a platinum group element as an essential component having incorporated therein at least one component of an appropriate other metal(s) or semi-metal(s) to render as a result the thermal conductivity of the composition not higher than 80% of that of the pure metal of the platinum group. According to the study made by the present inventors, an optical recording medium utilizing the thin metal film has, insofar as the thin metal film has a thermal conductivity specified by the invention, in spite of the fact that it is composed principally of a noble metal, an unexpected effect of being suitable for the recording system (by change in structure such as pit or cavity formation or bubble making) of the present invention. By reducing the thermal conductivity of the material constituting the thin metal film, localization of energy (heat) of the recording laser light occurred, and a marked increase in recording sensitivity was observed.

It was also found that the localization of energy has another effect of making distinct edges of the bubbles formed, thereby decreasing noise caused by indistinct edges of the bubbles.

Further it was found that the localization of energy has an effect of making distinct edges of the pits or cavities formed, thereby decreasing noise caused by indistinct edges of the pits or cavities formed. Addtionally, since the bubbles and pits or cavities were of uniform sizes, a decrease in so-called jitter was observed.

The above-mentioned effects were found to be more pronounced the lower the thermal conductivity. Thus, the more preferable thermal conductivity of the thin metal film according to the present invention is 60% or below of that of the platinum group pure metal.

Any metals or semi-metals which can markedly decrease the thermal conductivity of the platinum group element can be incorporated as by-component(s). Preferred examples of such metals or semi-metals are bismuth (Bi), titanium (Ti), aluminum (Al), selenium (Se), tellurium (Te), silicon (Si), germanium (Ge), tin (Sn) and the like. The ratio of such by-component(s) to be incorporated is optionally decided.

In the case where, for example, platinum is selected as the essential component, about 5% incorporation by number of atoms of any of the above-mentioned metals decreases the thermal conductivity to 80% of that of platinum. With Si, Ge, Sn, Te or Se, about 10% incorporation will decrease the thermal conductivity to about 60%. With Bi, Ti or Al, about 20% incorporation will decrease the thermal conductivity to 60%.

According to a study made by the present inventors, it was found that particularly excellent recording by bubble making can be achieved when the melting point, $\chi$, (°C.) of the above other metal or semi-metal and the thermal conductivity, $\kappa$, (cal/cm.sec.deg) of the thin metal film constituting the optical recording medium satisfy inequality (1). Also found was that particularly high sensitivity is achieved when inequality (3) is satisfied and, further, that stable recording over a wide recording power with a high recording stability can be achieved when inequality (2) is satisfied.

$$-9.0 \times 10^{-4}\chi - 2.4 \geqq \ln(1.2\kappa - 0.036) \geqq -7.8 \times 10^{-4}\chi - 4.1 \quad (1)$$

$$-9.0 \times 10^{-4}\chi - 2.4 \geqq \ln(1.2\kappa - 0.036) \geqq -8.7 \times 10^{-4}\chi - 3.4 \quad (2)$$

$$-8.7 \times 10^{-4}\chi - 3.4 \geq \ln(1.2\kappa - 0.036) \geq -7.8 \times 10^{-4}\chi - 4.1 \tag{3}$$

Examples of preferred by-components include bismuth, titanium, aluminum and silicon. There are no specific upper limits to the incorporation ratio of the by-components; but it is preferably less than 50% and more preferably less than 40% based on the total number of atoms.

In the case of recording media of the bubble making type, it has been known that for the purpose of promoting high-sensitivity the film thickness is preferably as small as possible. However with excessively thin films, the phenomena of formation of holes at the time of striking with the laser beam and gradual destruction of once formed bubbles with time, which adversely affects CNR, have been observed. Where a multi-element composition is used as in this invention, the film strength increases, thereby allowing a reduction of film thickness, while maintaining the bubble strength.

According to a study made by the present inventors, it was found that particularly excellent recording by pitting can be achieved when the melting point, $\chi$, (°C.) of the above other metal or semi-metal and the thermal conductivity, $\kappa$, (cal/cm.sec.deg) satisfy inequality (4) and more preferably inequality (5).

$$\ln(1.2\kappa - 0.036) \leq -8.7 \times 10^{-4}\chi - 3.4 \tag{4}$$

$$\ln(1.2\kappa - 0.036) \leq -7.8 \times 10^{-4}\chi - 4.1 \tag{5}$$

Examples of preferred by-components which satisfy the above inequalities are bismuth, selenium and tellurium. There are no specific upper limits to the incorporation ratio of the by-components; but it is preferably not less than 10% and more preferably in a range from 20 to 80% based on the total number of atoms.

The film thickness of the thin metal film is not specifically limited, but it is preferably such that the reflectivity when a laser beam is irradiated through the substrate falls in a range of from about 5 to 60%. When the thickness is below this range, sufficient tracking at the time of recording and reading cannot be accomplished, thereby rendering a stable recording and reading difficult to obtain. On the other hand, if the film is too thick, it cannot fully absorb the recording laser light, and recording is impossible or requires a high power, which is not preferred. For the thin metal film to have a reflectivity of this range, the film thickness, though dependent on the type of element to be incorporated, is generally from about 5 to 200 nm.

Measurement of the thermal conductivity of thin films having such thicknesses is generally very difficult; but since the thermal conductivity of a metal is, originating from free electrons, linearly proportional to electrical conductivity, the electrical conductivity, $\sigma$, of the thin film can give the thermal conductivity, $\kappa$, at absolute temperature, T, by the following equation (KINZOKU ZAIRYO KISOGAKU; Ryohei Ozaki, Asakura Shoten, p. 158, 1985).

$$\kappa = 5.02(\text{cal}\Omega/\text{sec.deg}^2)\sigma T \times 10^{-9} + 0.03$$

wherein,
  $\kappa$: thermal conductivity [cal/(cm.sec.deg)]
  T: absolute temperature (°K.)
  $\sigma$: electrical conductivity (1/$\Omega$.cm)

The thermal conductivity used in this invention is the one obtained from the above equation. Thermal conductivity depends, in the case of films, on the film thickness. The thermal conductivities of the thin metal films and platinum group pure metal as defined in this invention are therefore based on values measured on specimens having the same thickness.

The thin metal film layer may be formed in a conventional way such as sputtering, vacuum deposition, and ion plating. The process is not specifically limited.

The optical recording medium thus prepared is capable of permanent recording when struck with laser light, because the minutely roughened structure on the surface strongly absorbs the laser light, thereby bringing about the partial decomposition of the plastic substrate and the evolution of gas which forms either bubbles or pits or cavities as permanent deformations of the thin metal film.

In the present invention providing a thin intermediate layer made of nitrocellulose, etc., interposed between the transparent plastic substrate and the thin metal film layer will be effective in further improving recording sensitivity or in adjusting the shape of the pits to be formed.

Examples of materials for the intermediate layer include, besides nitrocellulose, various dyestuffs having low decomposition temperatures, various metals having extremely low melting temperatures, cellulose derivatives, thermoplastic resins having low molecular weights, and the like.

The optical recording medium of this invention may be protected by applying a known protecting layer to either surface of the medium. The recording medium may be of any shape such as circular, rectangular, or disc-shape, card-shape, etc.

Other features of the invention will become apparent in the course of the following descriptions of exemplary embodiments which are given for illustration of the invention and are not intended to be limiting thereof.

EXAMPLE 1 AND COMPARATIVE EXAMPLE A

In Example 1, a transparent plastic disc made of polycarbonate (substrate) having an inside diameter of 15 mm, an outside diameter of 130 mm, and a thickness of 1.2 mm was made by injection molding. The disc had a minutely roughened surface structure with a regular pitch of 0.3 $\mu$m measured in the direction parallel to the average surface level and a depth of 0.1 $\mu$m. The disc was then subjected to an electric voltage application by using a Pt target and a Bi target, to form by sputtering on the disc a thin film of 12 nm thickness in which the atomic ratio was 7:3, thereby giving an optical recording medium. The measurement described in this specification gave a thermal conductivity of the film of 0.044 (cal/cm.sec.deg). It had a reflectivity when laser light was irradiated through the substrate of 12% and an absorptivity of 60%, which are satisfactory for focusing and tracking for recording and reading, with a laser beam having a wavelength of 830 nm. Recording was performed while changing the recording laser power gradually from 1 mW to 10 mW, and the CNR was measured. The results are shown in FIG. 1.

In Comparative Example A, an optical recording medium was prepared by forming a Pt film of 12 nm thickness on the aforementioned transparent plastic disc made of polycarbonate having a minutely roughened surface, by means of sputtering using a Pt target only. The thermal conductivity of the thus prepared platinum thin layer was 0.091 (cal/cm.sec.deg). Recording was performed in the same manner as in Example 1 while changing the recording laser power gradually, and the CNR was measured. The results are also shown in FIG. 1.

It is noted from FIG. 1 that with the optical recording medium of Example 1, according to the present invention, the CNR rapidly rises in a power region lower than that in the case of Comparative Example A, and thus a high-sensitivity recording was possible. Jitter was measured on the thus prepared optical recording media at a linear velocity of 1.4 m/sec. While the optical recording medium of Comparative Example A showed a standard deviation of 50 nsec, that of the optical recording medium of Example 1 was 20 nsec.

Figure 2:
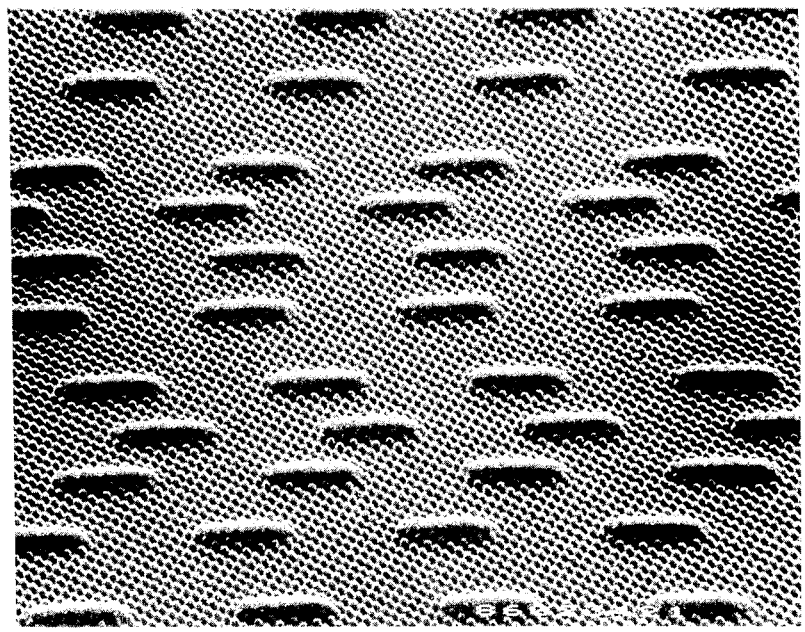
FIGS. 2 and 3 are electron microscopy photographs showing the recording states of the recording medium of this invention and that of Comparative Example A, respectively.
Figure 3:
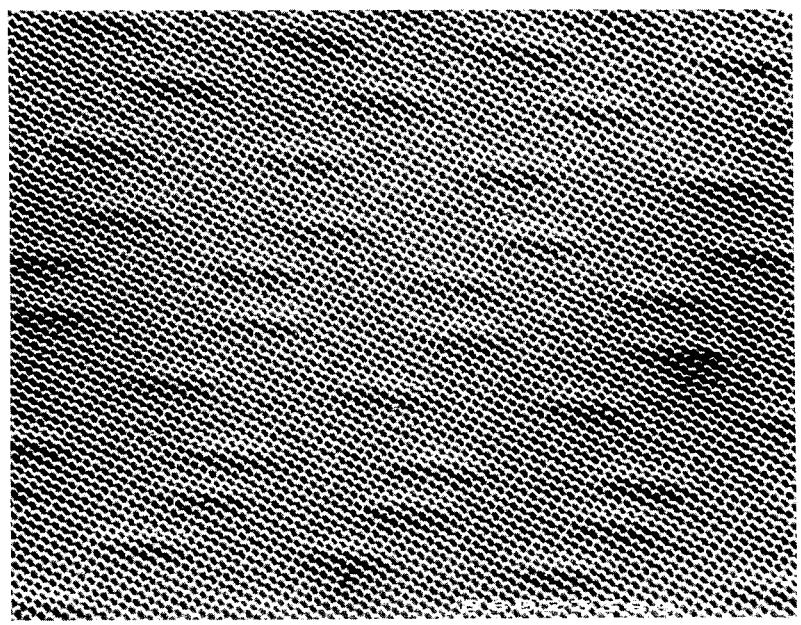

The shapes of the bubbles formed by recording at a power of 7 mW for the two media may be compared by inspection of the electron microscopy photographs shown in FIG. 2 (Example 1) and FIG. 3 (Comparative Example A). These photographs show that the forms of the bubbles are clear in Example 1, and it therefore is postulated that the cause of the high CNR lies in the form of the bubbles.

EXAMPLES 2 TO 4 AND COMPARATIVE EXAMPLE 8

Optical recording media were prepared in the same manner as in Example 1 except that the thin metal film layers were films of Pt having incorporated Ti, Al, Si and Rh respectively thereinto by sputtering with the compositions and film thicknesses shown in Table 1. They were examined in the same manner as in Example 1. The optical recording media in Examples 2 to 4 according to the present invention produced the same effect as that shown in FIG. 1 for Example 1. In the case of the optical recording medium in Comparative Example B which is not according to the present invention, the sensitivity obtained was only of the same degree as that of Comparative Example A.

TABLE 1

|  | Composition (atomic ratio) | Film thickness (nm) | Reflectivity (%) | Thermal conductivity (cal/cm · sec · °C.) |
|---|---|---|---|---|
| Ex. 2 | Pt:Ti = 7:3 | 12 | 12.0 | 0.045 |
| 3 | Pt:Al = 8:2 | 12 | 12.0 | 0.052 |
| 4 | Pt:Si = 9:1 | 12 | 8.0 | 0.049 |
| Comp. Ex. B | Pt:Rh = 8:2 | 12 | 18.0 | 0.083 |

REFERENCE EXAMPLE A

A transparent polycarbonate disc having an inside diameter of 15 mm, an outside diameter of 130 mm, and a thickness of 1.2 mm was made by injection molding. The disc had a plane surface. The disc was then subjected to an electric voltage application by using a Pt target and a Bi target to form by sputtering on the disc a thin film of 12 nm thickness having the atomic ratio of 7:3, thereby giving an optical recording medium. The measurement described in this specification gave a thermal conductivity of the film of 0.045 (cal/cm.sec.deg). It had, when a laser beam was irradiated through the substrate, a reflectivity of 35% and an absorptivity of 51% which are satisfactory for forcussing and tracking for recording and reading, with a laser beam having a wavelength of 830 nm. Recording was performed while changing the recording laser power gradually from 1 mW to 10 mW, and the CNR was measured. The results are shown in FIG. 1. Comparison with the results for Example 1 shows that a marked high-sensitivity has been achieved by using a substrate having a surface of minutely roughened structure.

EXAMPLE 5 AND COMPARATIVE EXAMPLE C

Figure 4:
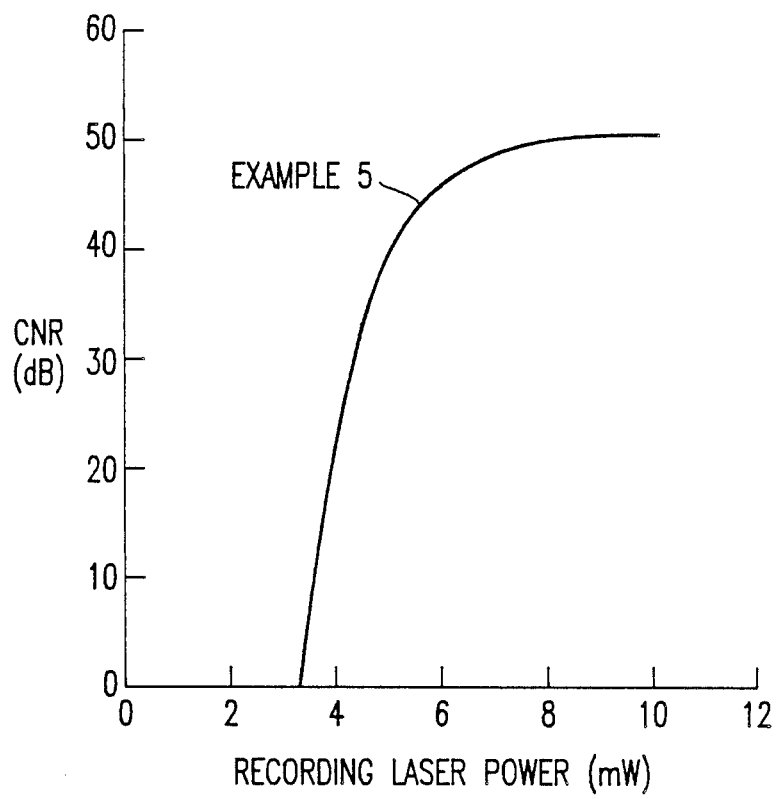
FIG. 4 is a diagram showing the relationship between the recording laser power and the CNR measured on the optical recording medium obtained in Example 5.

In Example 5, a transparent polycarbonate disc having an inside diameter of 15 mm, an outside diameter of 130 mm, and a thickness of 1.2 mm was made by injection molding. The disc had a minutely roughened surface structure with a regular pitch of 0.3 $\mu$m measured in the direction parallel to the average surface level and a depth of 0.1 $\mu$m. The disc was then subjected to an electric voltage application by using a Pt target and a Se target, to form on the disc by sputtering a thin film of 12 nm thickness having the atomic ratio of 1:1, thereby giving an optical recording medium. The measurement described in this specification gave a thermal conductivity of the film of 0.031 (cal/cm.sec.deg). It had a reflectivity, when a laser beam was irradiated through the substrate side, of 25% and an absorption ratio of 55% which are satisfactory for focussing and tracking for recording and reading, with a laser beam having a wavelength of 830 nm. Recording was performed while changing the recording laser power gradually from 1 mW to 10 mW, and the CNR was measured. The results are shown in FIG. 4. Electron microscopic observation showed that cavities were formed on the surface.

In Comparative Example C, an optical recording medium was prepared by forming a Pt film of 12 nm thickness on the above-mentioned disc made of transparent polycarbonate resin having a minutely roughened surface, by means of sputtering using a Pt target only. The thermal conductivity of the thus prepared platinum thin layer was 0.091 (cal/cm.sec.deg). Recording was performed in the same manner as in Example 5 while changing the recording laser power gradually, and the CNR was measured. However, only bubbles were formed, and no pits or cavities were formed with laser powers in the range measured.

That is, according to the present invention, there can be obtained an optical recording medium of a pitting type at a lower laser power compared to that for the recording medium of Comparative Example C which has a thin metal film composed only of Pt.

EXAMPLE 6 AND EXAMPLE 7

In Example 6, optical recording media were prepared in the same manner as in Example 1 except that the thin metal film layer used was a film of Pt having incorporated Bi thereinto made by sputtering. They were examined in the same manner as in Example 1. In the film the atomic ratio of Pt and Bi was 1:1, and the thermal conductivity was 0.032 (cal/cm.sec.deg). It showed a reflectivity of 18% and an absorptivity of 65%. Results of measurement showed the same effect as that of Example 5 in FIG. 4 proving that there was obtained an optical recording medium of a pitting type.

In Example 7, an intermediate layer of nitrocellulose having a thickness of 0.1 $\mu$m was provided between the substrate and the thin metal film layer by a spin coating process. The obtained optical recording medium was examined in the same manner as in Example 1 to show that the recording laser power with which the CNR amounts to 50 dB was reduced further by as much as 1 mW.

Obviously, numerous modifications and variations of the present invention are possible in light of the above teachings. It is therefore to be understood that within the scope of the appended claims, the invention may be practiced otherwise than as specifically described herein.

What is claimed is:

1. An optical recording medium, comprising a transparent plastic substrate having a surface of minutely roughened structure and a thin metal film formed on said substrate, said optical recording medium being capable of absorbing laser light of a specific wavelength region and undergoing a change in the structure by the action of the laser light, thereby recording data on a medium, and wherein said thin metal film comprises a metal of the platinum group and a second metal or semi-metal such that the thermal conductivity of said thin metal film is not higher than 80% of the thermal conductivity of the platinum group pure metal, wherein said transparent plastic substrate has a surface of regularly roughened structure having a regular pitch and a depth of 0.01 to 1 μm, wherein said regular pitch measured in the direction parallel to the average surface level is smaller than said wavelength of said laser light, and wherein said second metal or semi-metal is selected from the group consisting of bismuth, titanium, aluminum, selenium, tellurium, silicon, germanium and tin.

2. The optical recording medium of claim 1, wherein said medium has a reflectivity before recording of from 5 to 60% when laser light is irradiated through said plastic substrate.

3. The optical recording medium of claim 1, wherein said surface of minutely roughened structure is formed by a plastic forming process selected from the group consisting of calendering, injection molding, injection-compression molding, compression molding, and photopolymer process.

4. The optical recording medium of claim 1, wherein said metal of the platinum group is selected from the group consisting of platinum, ruthenium, rhodium, palladium, osmium and iridium.

5. The optical recording medium of claim 4, wherein said metal of the platinum group is platinum.

6. The optical recording medium of claim 1, wherein said thermal conductivity of said thin metal film is not more than 60% of the thermal conductivity of the platinum group pure metal.

7. The optical recording medium of claim 1, wherein said thin metal film has a thickness of from 5 nm to 200 nm.

8. The optical recording medium of claim 1, wherein said thin metal film is protected with a protecting layer.

9. The optical recording medium of claim 1, wherein said transparent plastic substrate is a thermoplastic resin.

10. The optical recording medium of claim 9, wherein said thermoplastic resin is selected from the group consisting of polyester resins, polyolefin resins, polyamide resins, polycarbonate resins, and polymethacrylate resins.

11. The optical recording medium of claim 1, wherein said change in the structure is bubble making.

12. The optical recording medium of claim 11, wherein the melting temperature, $\chi$, (°C.) of said second metal or semi-metal and said thermal conductivity, $\kappa$, (cal/cm.sec.deg) of said thin metal film satisfy the following inequality (I)

$$-9.0 \times 10^{-4}\chi - 2.4 \geq \ln(1.2\kappa - 0.036) \geq -7.8 \times 10^{-4}\kappa 4.1 \quad (I).$$

13. The optical recording medium of claim 11, wherein the melting temperature, $\chi$, (°C.) of said second metal or semi-metal and said thermal conductivity, $\kappa$, (cal/cm.sec.deg) of said thin metal film satisfy the following inequality (II)

$$-9.0 \times 10^{-4}\chi - 2.4 \geq \ln(1.2\kappa - 0.036) \geq -8.7 \times 10^{-4}\chi - 3.4 \quad (II).$$

14. The optical recording medium of claim 11, wherein the melting temperature, $\chi$, (°C.) of said second metal or semi-metal and said thermal conductivity, $\kappa$, (cal/cm.sec deg) of said thin metal film satisfy the following inequality (III)

$$-8.7 \times 10^{-4}\chi - 3.4 \geq \ln(1.2\kappa - 0.036) \geq -7.8 \times 10^{-4}\chi - 4.1 \quad (III).$$

15. The optical recording medium of claim 11, wherein said second metal or semi-metal is at least one member selected from the group consisting of bismuth, titanium, silicon and aluminum.

16. The optical recording medium of claim 1, wherein said change in the structure is the formation of pits or cavities.

17. The optical recording medium of claim 16, wherein the melting temperature, $\chi$, (°C.) of said second metal or semi-metal and said thermal conductivity, $\kappa$, (cal/cm sec.deg) of said thin metal film satisfy the following inequality (IV)

$$\ln(1.2\kappa - 0.036) \leq -8.7 \times 10^{-4}\chi - 3.4 \quad (IV).$$

18. The optical recording medium of claim 16, wherein the melting temperature, $\chi$, (°C.) of said second metal or semi-metal and said thermal conductivity, $\kappa$, (cal/cm.sec.deg) of said thin metal film satisfy the following inequality (V)

$$\ln(1.2\kappa - 0.036) \leq -7.8 \times 10^{-4}\chi - 4.1 \quad (V).$$

19. The optical recording medium of claim 16, wherein said second metal or semi-metal is at least one member selected from the group consisting of bismuth, selenium and tellurium.

20. The optical recording medium of claim 16, wherein said thermal conductivity of said thin metal film is not more than 60% of the thermal conductivity of the platinum group pure metal, and the melting temperature, $\chi$, (°C.) of said second metal or semi-metal and said thermal conductivity, $\kappa$, (cal/cm.sec.deg) of said thin metal film satisfy the following inequality (IV)

$$\ln(1.2\kappa - 0.036) \leq -8.7 \times 10^{-4}\chi - 3.4 \quad (IV).$$

21. The optical recording medium of claim 1, further comprising an intermediate layer between said thin metal film and said substrate.

22. The optical recording medium of claim 21, wherein said intermediate layer is capable of generating gas by the action of said laser light.

23. The optical recording medium of claim 21, wherein said intermediate layer is nitrocellulose.

24. A process for conducting permanent recording, comprising the step of: irradiating said optical recording medium of claim 11, thereby causing gas generation by a local decomposition of said transparent plastic substrate and bubble formation.

25. The optical recording medium of claim 11, further comprising recorded data in the form of bubbles therein.

26. A process for conducting permanent recording, comprising the step of: irradiating said optical recording medium of claim 16, thereby causing gas generation by a local decomposition of said transparent plastic substrate and pit or cavity formation.

27. The optical recording medium of claim 16, further comprising recorded data in the form of pits or cavities on said thin metal film.

28. A process for conducting permanent recording, comprising the step of: irradiating said optical recording medium of claim 21, thereby causing gas generation by a local decomposition of said transparent plastic substrate or said intermediate layer and pit or cavity formation.

29. The optical recording medium of claim 21, further comprising recorded data in the form of pits or cavities.

* * * * *